(12) United States Patent
Wong et al.

(10) Patent No.: US 11,200,488 B2
(45) Date of Patent: Dec. 14, 2021

(54) NETWORK ENDPOINT PROFILING USING A TOPICAL MODEL AND SEMANTIC ANALYSIS

(71) Applicant: Cisco Technology, Inc., San Jose, CA (US)

(72) Inventors: Pok Wong, Santa Clara, CA (US); Lokesh Ethirajan, Sunnyvale, CA (US); Amol Borole, Fremont, CA (US); Ramesh Nampelly, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1019 days.

(21) Appl. No.: 15/444,753

(22) Filed: Feb. 28, 2017

(65) Prior Publication Data

US 2018/0247188 A1 Aug. 30, 2018

(51) Int. Cl.
*G06N 3/08* (2006.01)
*H04W 48/20* (2009.01)
(Continued)

(52) U.S. Cl.
CPC ........... *G06N 3/08* (2013.01); *G06F 16/3344* (2019.01); *G06F 16/35* (2019.01); *G06F 40/30* (2020.01);
(Continued)

(58) Field of Classification Search
CPC ....... G06N 3/08; G06F 16/35; G06F 16/3344; G06F 40/30; G06F 40/242; H04L 63/105; H04W 48/20; H04W 4/70
See application file for complete search history.

(56) References Cited

U.S. PATENT DOCUMENTS 6,122,639 A    9/2000 Babu et al.
6,938,087 B1 * 8/2005 Abu-Samaha ...... H04L 67/2814
                                              370/465
(Continued)

FOREIGN PATENT DOCUMENTS

WO    WO-2016003423 A1    1/2016

OTHER PUBLICATIONS

François, et al., "Machine Learning Techniques for Passive Network Inventory", IEEE Transactions on Network and Service Management, pp. 244-257, 2010, IEEE.
(Continued)

*Primary Examiner* — Tsu-Chang Lee
(74) *Attorney, Agent, or Firm* — Behmke Innovation Group LLC; Kenneth J. Heywood; Jonathon P. Western

(57) ABSTRACT

In one embodiment, a device in a network extracts words from traffic data for a particular endpoint node in the network. The device determines one or more topical categories associated with the particular endpoint node by applying a machine learning-based topical model to the extracted words. The device identifies one or more similar endpoint nodes in the network based on the determined one or more topical categories associated with the particular endpoint node and on one or more topical categories associated with the one or more similar endpoint nodes. The device determines a device type for the particular endpoint node based on a device type associated with the one or more similar endpoint nodes.

18 Claims, 7 Drawing Sheets

(51) Int. Cl.
*G06F 16/35* (2019.01)
*G06F 16/33* (2019.01)
*H04L 29/06* (2006.01)
*G06F 40/30* (2020.01)
*H04W 4/70* (2018.01)
*G06F 40/242* (2020.01)

(52) U.S. Cl.
CPC .......... *H04L 63/105* (2013.01); *H04W 48/20* (2013.01); *G06F 40/242* (2020.01); *H04W 4/70* (2018.02)

(56) References Cited

U.S. PATENT DOCUMENTS

| | | | |
|---|---|---|---|
| 7,181,508 B1 | 2/2007 | Sretenovic | |
| 8,117,216 B1* | 2/2012 | Chanda | G06F 16/9038 |
| | | | 707/754 |
| 10,536,541 B2* | 1/2020 | Comstock | H04W 4/14 |
| 2008/0005038 A1 | 1/2008 | Grandcolas et al. | |
| 2008/0126286 A1 | 5/2008 | Machani | |
| 2009/0193134 A1* | 7/2009 | Moore | H04N 21/44222 |
| | | | 709/231 |
| 2012/0254333 A1* | 10/2012 | Chandramouli | G06Q 10/107 |
| | | | 709/206 |
| 2014/0181290 A1* | 6/2014 | Wong | H04L 63/10 |
| | | | 709/224 |
| 2015/0085858 A1* | 3/2015 | Kamboh | H04M 3/5116 |
| | | | 370/353 |
| 2015/0131899 A1* | 5/2015 | Lu | G06K 9/626 |
| | | | 382/159 |
| 2016/0269176 A1* | 9/2016 | Pang | H04L 9/0841 |
| 2017/0118636 A1* | 4/2017 | Zoorob | H04W 12/0023 |

OTHER PUBLICATIONS

Lim, et al., "Dynamic Security Policy Learning", WISG'09, Nov. 13, 2009, Chicago, Illinois, USA. 10 pages, ACM.

"Reverse engineering Google Nest Devices" http://experimental-platform.tumblr.com/post/137835649425/reverse-engineering-google-nest-devices; pp. 1-5.

* cited by examiner

NETWORK ENDPOINT PROFILING USING A TOPICAL MODEL AND SEMANTIC ANALYSIS

TECHNICAL FIELD

The present disclosure relates generally to computer networks, and, more particularly, to profiling an endpoint in a network using a topic model and semantic analysis.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking standpoint, however, it will become increasingly more challenging to restrict which services, interfaces, etc. are accessible to any given network entity. Notably, as the IoT continues to expand, it becomes increasingly more challenging to predict the number and variety of things connected to the network, which are used today for purposes of implementing access control, security, performance optimizations, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
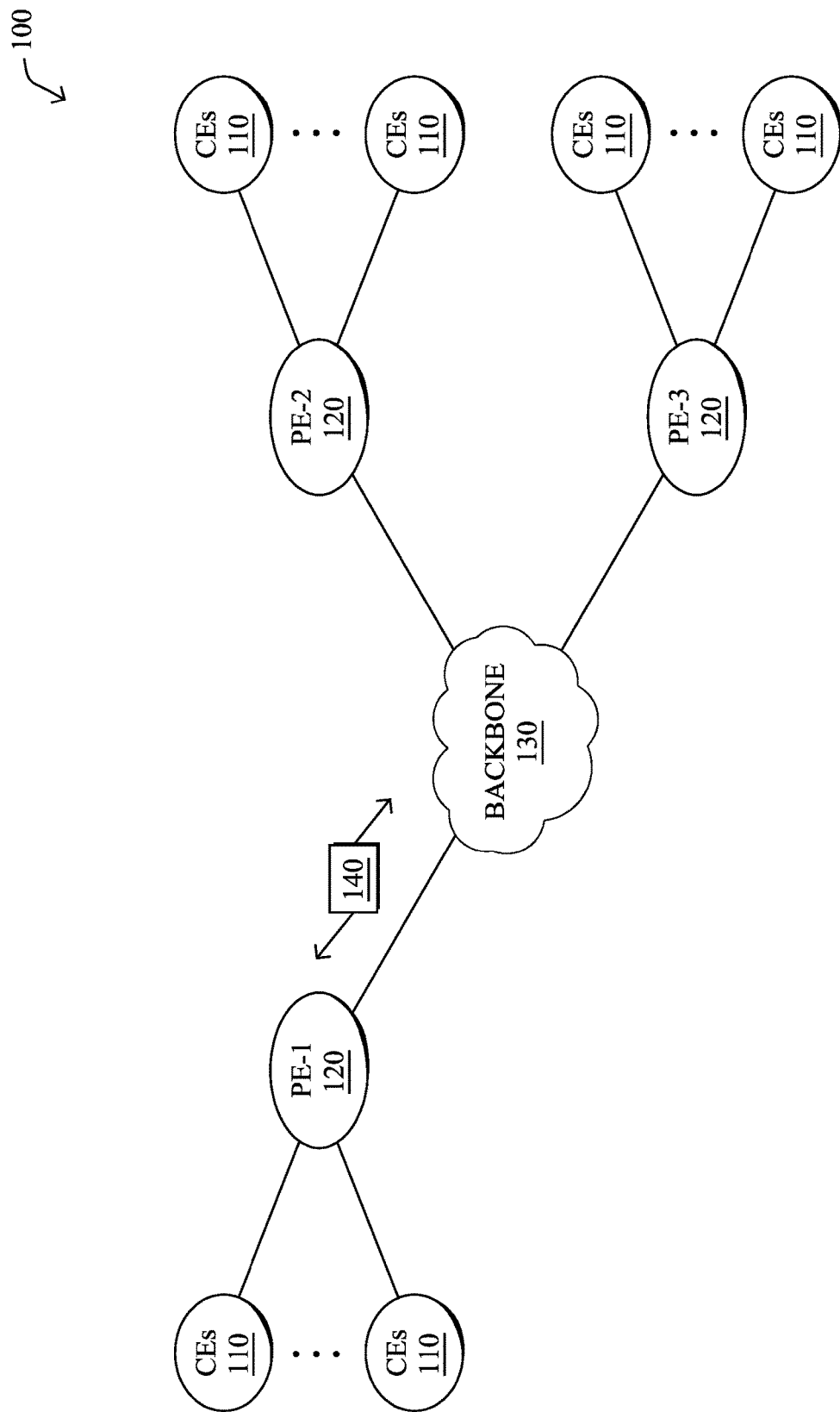
FIGS. 1A-1B illustrate an example communication network.

According to one or more embodiments of the disclosure, a device in a network extracts words from traffic data for a particular endpoint node in the network. The device determines one or more topical categories associated with the particular endpoint node by applying a machine learning-based topical model to the extracted words. The device identifies one or more similar endpoint nodes in the network based on the determined one or more topical categories associated with the particular endpoint node and on one or more topical categories associated with the one or more similar endpoint nodes. The device determines a device type for the particular endpoint node based on a device type associated with the one or more similar endpoint nodes.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
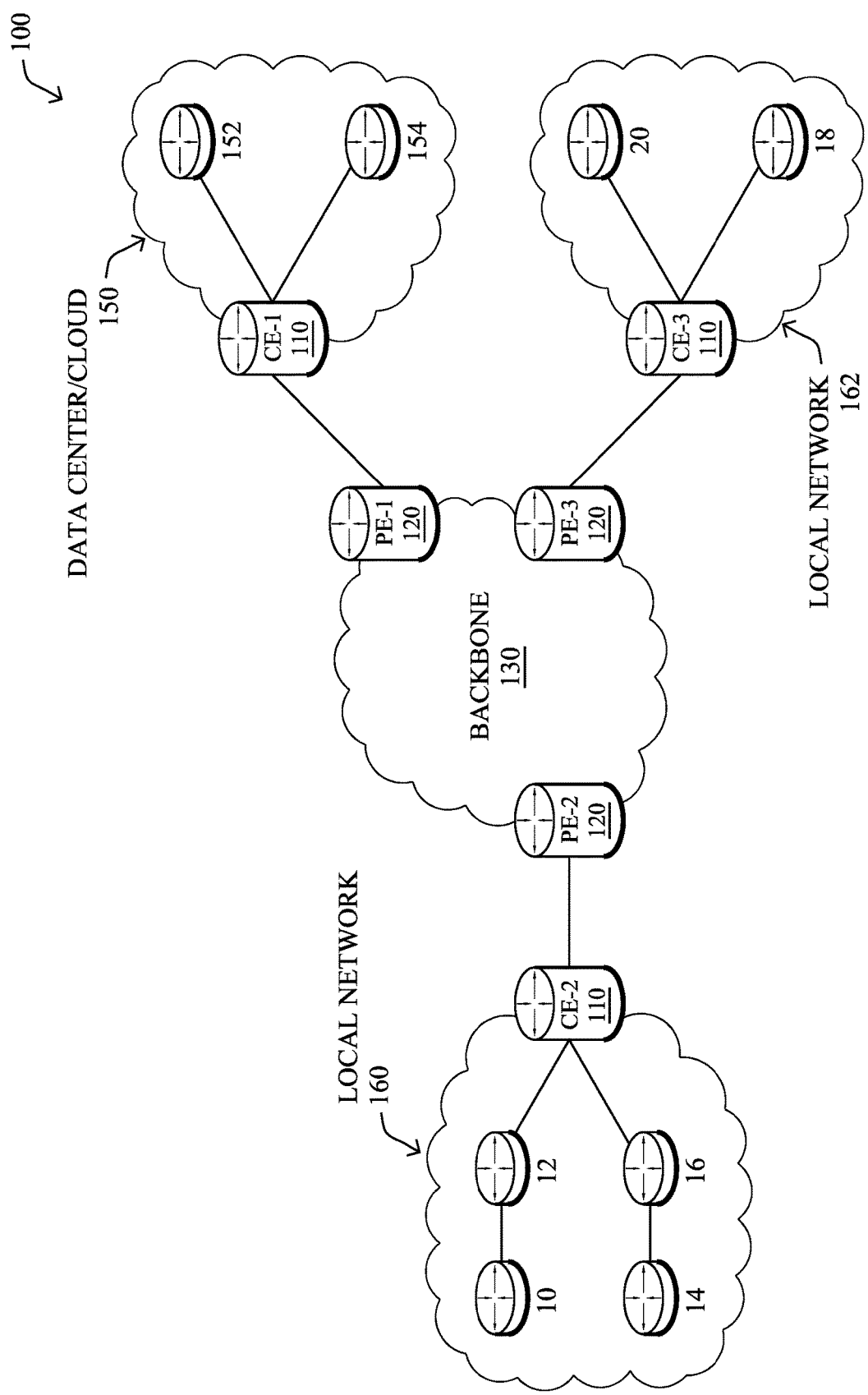

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers.

In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
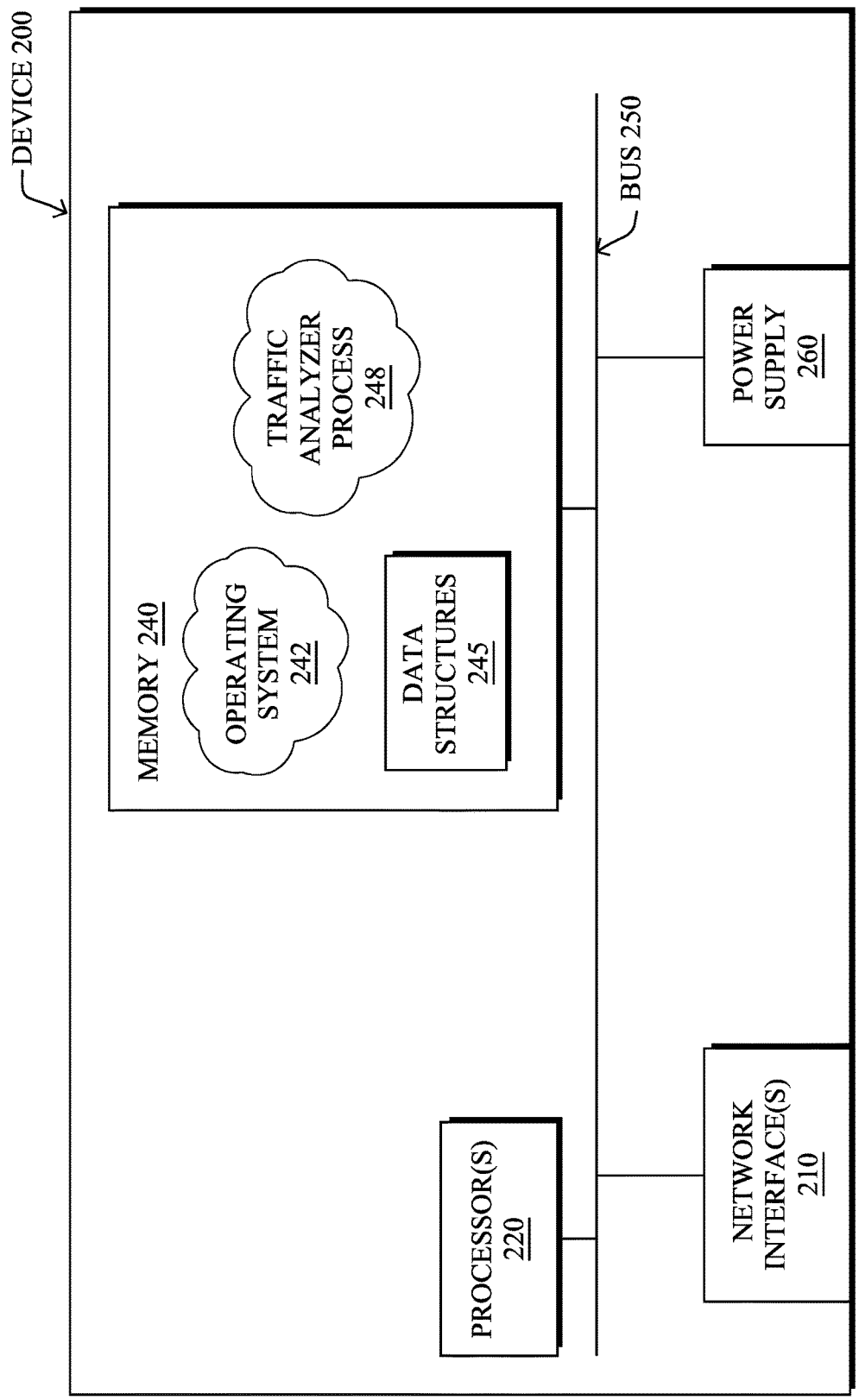
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analyzer process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Traffic analyzer process 248 includes computer executable instructions that, when executed by processor(s) 220, cause device 200 to analyze available information about a traffic flow or set of traffic flows, to discern the device type of the endpoint node associated with the traffic flows. According to various embodiments, traffic analyzer process 248 may employ any number of machine learning techniques, to assess a given traffic flow or set of traffic flows in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, traffic analyzer process 248 can use the model M to classify new data points, such as information regarding new traffic flows in the network. Often, M is a statistical model, and the cost function is inversely proportional to the likelihood of M, given the input data.

In various embodiments, traffic analyzer process 248 may employ one or more supervised, unsupervised, or semi-supervised machine learning models, to analyze traffic data. Generally, supervised learning entails the use of a training dataset, which is used to train the model to apply labels to the input data. For example, the training data may include sample traffic data that is labeled as "cellphone-associated," or "not-cellphone-related." On the other end of the spectrum are unsupervised techniques that do not require a training set of labels. Notably, while a supervised learning model may look for previously seen patterns that have been labeled as such, an unsupervised model may instead look to whether there are changes or differences between the trained model and observed behavior of the network traffic. Semi-supervised learning models take a middle ground approach that uses a greatly reduced set of labeled training data.

Example machine learning techniques that traffic analyzer process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times that traffic analyzer process 248 incorrectly identified an endpoint device as being a "cellular phone." Conversely, the false negatives of the model may refer to the number of traffic flows that the model incorrectly determined that the endpoint node/device is not a cellular phone, when it actually is. True negatives and positives may refer to the number of traffic flows that the model correctly classifies, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

In some cases, traffic analyzer process 248 may assess the captured traffic data on a per-flow basis. In other embodiments, traffic analyzer process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
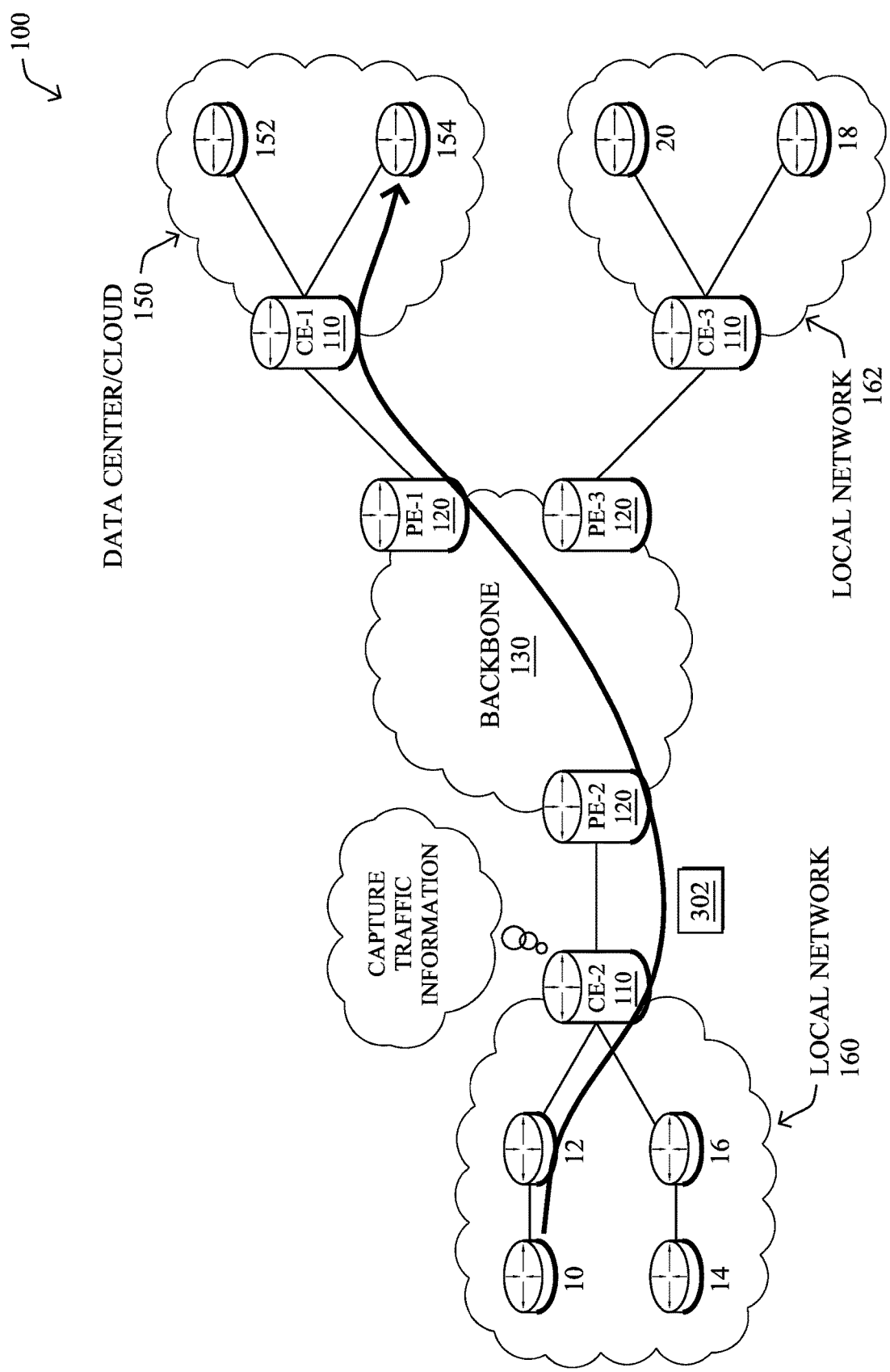
FIG. 3 illustrates an example of a network device capturing traffic data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows. While the packets 302 flow through edge router CE-2, router CE-2 may capture traffic data regarding the flow. Notably, traffic flows can be monitored in many cases through the use of a tap or Switch Port Analyzer (SPAN).

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application and or device associated with the traffic flow (e.g., packets 302 were sent by a web browser of node 10, packets 302 were sent by a videoconferencing device, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

In the specific case of encrypted traffic, the networking device that captures the traffic data may also be a proxy device, in some embodiments. For example, CE-2 or another intermediary device may act as a man-in-the-middle between endpoints, to intercept the encryption credentials used and simulate responses from each respective node. In doing so, the device may be able to decrypt and analyze the payloads of the packets. Alternatively, in further embodiments, the device may simply capture header information from encrypted traffic, such as Transport Layer Security (TLS) header information.

As noted above, the number of different types of endpoint nodes in a computer network is increasing rapidly. Thus, determining the device type of an endpoint node may be a prerequisite when applying an appropriate security policy to the endpoint. For example, a voice over IP (VoIP) endpoint node should not be given access to content in the network such as source code, intellectual property, etc. In some cases, access rules may be based on information gleaned from the access itself, such as from the Remote Authentication Dial-In User Service (RADIUS) protocol, resource request traffic (e.g., DHCP or HTTP traffic), and/or query or discovery protocols in use, such as the Link Layer Discovery Protocol (LLDP) and Cisco™ Discovery Protocol (CDP). A policy administrator can then input the conditions on this information and/or a default set of policy conditions can be included in the security system. However, this approach requires the administrator to update the policy rules and conditions repeatedly, as new versions and types of devices are deployed.

Network Endpoint Profiling Using a Topical Model and Semantic Analysis

The techniques herein allow for the use a topical model and semantic analysis, for profiling an endpoint node in a network (e.g., determining the device type of the node). In some aspects, the techniques herein may use machine learning to determine topical categories of words found in the traffic associated with a given endpoint node. In turn, a measure of similarity between the topics of the endpoint node and those of other nodes can be used to determine the device type of the node. In further aspects, the determined device type can be used to apply a security policy to the endpoint node (e.g., by restricting access of the node to certain content or resources on the network, etc.).

Specifically, according to one or more embodiments of the disclosure as described in detail below, a device in a network extracts words from traffic data for a particular endpoint node in the network. The device determines one or more topical categories associated with the particular endpoint node by applying a machine learning-based topical model to the extracted words. The device identifies one or more similar endpoint nodes in the network based on the determined one or more topical categories associated with the particular endpoint node and on one or more topical categories associated with the one or more similar endpoint nodes. The device determines a device type for the particular endpoint node based on a device type associated with the one or more similar endpoint nodes.

Illustratively, the techniques described herein may be performed by hardware, software, and/or firmware, such as in accordance with the traffic analyzer process 248, which may include computer executable instructions executed by the processor 220 (or independent processor of interfaces 210) to perform functions relating to the techniques described herein.

Operationally, network packet captures from a diverse set of endpoint nodes were observed, including thermostats, video cameras, and laptops. From the analysis of the packet captures, several observations were made regarding the words extracted from the. First, across multiple device of the same type, word clusters (e.g., 'Windows,' 'Apple,' 'Mozilla,' 'Safari,' etc.) exists in their packets. Second, word patterns also exist in the same packet or across different packets of the same node. Third, multiple words may be related, but in the form of synonyms, symbols, abbreviations, etc., that are semantically equivalent (e.g., 'MSFT' and 'Microsoft,' etc.). Thus, the semantic meanings of the extracted words, in conjunction with statistical data mining, offer insight into the classification of the node.

Figure 4:
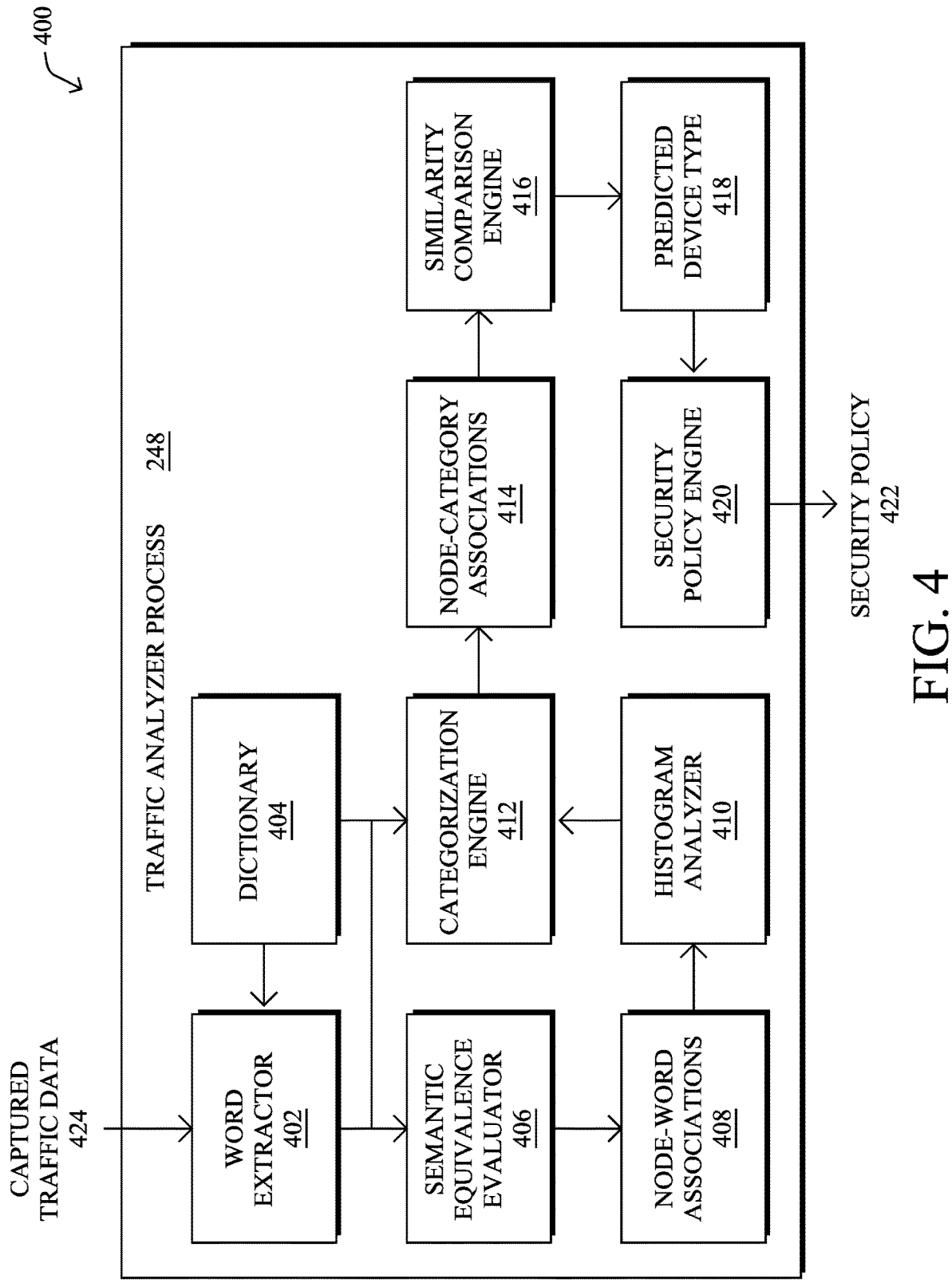
FIG. 4 illustrates an example architecture for determining a device type and applying a security policy.

FIG. 4 illustrates an example architecture 400 for determining a device type and applying a security policy, according to various embodiments. As shown, traffic analyzer process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes traffic analyzer process 248. Further, while certain functionalities are described with respect to the sub-processes and memory locations, these functions can be added, removed, or combined as desire, in further implementations.

Generally, traffic analyzer process 248 may receive captured traffic data 424 regarding one or more traffic flows associated with a particular endpoint node in the network. In some cases, the device executing traffic analyzer process 248 may captured the traffic data directly. In other cases, the device may receive captured traffic data 424 from one or more networking devices in the network (e.g., routers, taps, switches, etc.). For example, captured traffic data 424 may include Simple Network Management Protocol (SNMP) system description information (sysDescr), DHCP class-identifier and packets, HTTP User Agent information and/or packet data, Network Mapper (NMAP) service information, DNS packet information, or any other traffic data captured from the packets associated with the endpoint node.

In various embodiments, traffic analyzer process 248 may include a word extractor 402. Generally, word extractor 402 is configured to extract words from captured traffic data 424 based on a dictionary 404 of words. Dictionary 404 may include data from any number of sources and may also include semantic information that relates multiple words in the domain. For example, dictionary 404 may include stock symbols, encyclopedic information (e.g., from Wikipedia, etc.), domain knowledge regarding the local network, word abbreviations, combinations thereof, and the like. Using dictionary 404, word extractor 402 may also extract words from non-words in captured traffic data 424. This will, for example, eliminate IDs, numeric values, etc., that do not help with the classification/profiling of the endpoint node. In further embodiments, the device executing traffic analyzer process 248 may receive the extracted words from the device(s) that generate captured traffic data 424. For example, the device executing traffic analyzer process 248 may cause one or more remote networking devices to extract the words after capturing traffic data 424 and receive the extracted words for further processing.

Traffic analyzer process 248 may also execute a semantic equivalence evaluator 406, in some embodiments. In general, semantic equivalence evaluator 406 is operable to identify semantic equivalence between the words extracted from captured traffic data 424 and the words in dictionary 404. Such semantic equivalence may indicate, for example, that a word extracted from captured traffic data 424 and one or more words in dictionary 404 are conceptually related or have the same or similar meanings. For example, the words 'streaming,' 'video,' and 'camera' may be semantically related in the computing equipment domain, even if unrelated in the general domain. While semantic equivalence evaluator 406 may be optionally included as part of traffic analyzer process 248, its execution may help to make further topical connections that would not otherwise be possible based solely on the words extracted from captured traffic data 424.

Traffic analyzer process 248 may store information regarding the words extracted from captured traffic data 424, potentially their semantically equivalent words from dictionary 404, and the associated endpoint node in node-word associations 408. For example, node-word associations 408 may be stored using a hashmap with a unique identifier for the endpoint node (e.g., MAC address, UDID, etc.) as a key value on an in-memory database, such as Redis. In this way, traffic analyzer process 248 may populate node-word associations 408 for any number of endpoint nodes in the network and/or using a predefined set of node-word associations (e.g., relating certain device types to words observed in their traffic in a test environment or one or more other networks, etc.).

In various embodiments, traffic analyzer process 248 may execute any number of machine learning processes, to model the topics related to the words in node-word associations 408. In some embodiments, traffic analyzer process 248 may execute a histogram analyzer 410. Generally, histogram analyzer 410 may apply one or more histograms on the words in node-word associations 408 using a naïve Bayesian approach, to identify the main keywords in node-word associations 408 that describe the endpoint node under analysis. For instance, the words 'stream_.,' 'streaming,' 'video,' and 'camera' were frequently observed in the various packet attributes of traffic associated with a security camera endpoint. Naïve Bayesian approaches also allow for the categorization of a set of words. For example, naïve Bayesian approaches can be used to determine whether a given book is about a 'face' or 'car.' In such a case, the 'face' category may emphasize the codewords that semantically represent 'nose,' 'eye,' 'mouth,' etc., while the 'car' category may emphasize other codewords that represent 'wheel,' 'window,' etc. In other words, given a collection of training examples, histogram analyzer 410 may be trained to learn/classify different distributions for different categories.

Based on the results of histogram analyzer 410, traffic analyzer process 248 may execute a categorization engine 412 that summarizes/associates the resulting words to key topical categories. In one embodiment, categorization engine 412 may combine the key categories using a machine learning-based clustering approach. However, clustering words may produce mathematically correct solutions, but semantically meaningless combinations. Thus, in further embodiments, categorization engine 412 may validate the results of the clustering against dictionary 404, to ensure that the word combinations in a given category are semantically meaningful.

Traffic analyzer process 248 may store the resulting outputs of categorization engine 412 in node-category associations 414, which associates a given endpoint node with one or more topical categories that are based on the words extracted from the traffic associated with the node. Similar to node-word associations 408, node-category associations 414 may be implemented as a hashmap with the unique identifier of the endpoint node as a key in a persistent database, such as Redis. For example, based on the words extracted from the traffic associated with a given endpoint node, the endpoint node may be associated with the categorical topics of 'streaming,' and 'temperature' (e.g., if the endpoint node is a thermostat).

In various embodiments, traffic analyzer process 248 may execute a similarity comparison engine 416, to compare the topical categories associated with the endpoint node under analysis with that of the other endpoint nodes in node-category associations 414 for which the device type is already known. This is consistent with the observed behavior of existing network traffic. For example, an endpoint node that is similar to a Mac laptop may have similar associated topical categories of 'Safari,' 'Mozilla,' 'Apple,' etc. In some cases, similarity comparison engine 416 may use latent semantic analysis to determine the similarities. Notably, latent semantic analysis is a technique that can be used to determine the set of concepts/topical categories related to a document, with the understanding that words that are close in meaning will occur in similar pieces of text. Such an approach can similarly be applied to the words extracted from captured traffic data 424 from the various endpoint nodes.

In some embodiments, similarity comparison engine 416 may calculate a similarity score between the one or more topical categories associated with the endpoint under analysis and those of the other endpoint nodes. For example, in one embodiment, similarity comparison engine 416 may use a Fisher kernel as the measure of similarity. Generally, a Fisher kernel is a function that measures the similarity of two objects on the basis of sets of measurements for each object and a statistical model. In a classification procedure, the class for a new object, whose real class is unknown, can be estimated by minimizing, across classes, an average of the Fisher kernel distance from the new object to each known member of the given class.

Based on the most similar endpoint node(s) to the endpoint node under analysis, similarity comparison engine 416 may output a predicted device type 418 for the endpoint node under analysis. For example, if the endpoint node under analysis has topical categories that are most similar to that of a known security camera, predicted device type 418 may indicate that the endpoint node is also a security camera.

In various embodiments, traffic analyzer process 248 may provide the predicted device type 418 of the endpoint node under analysis to a security policy engine 420, which may be executed either locally or remotely. Among other possible considerations, security policy engine 420 may apply a selected security policy 422 to the endpoint node under analysis based on predicted device type 418 for the node. Notably, security policy 422 may prohibit the endpoint node from accessing certain content or services/resources in the network, based on the device type of the node. In some embodiments, while traffic analyzer process 248 is discerning the device type of the endpoint node, security policy engine may apply a security policy 422 that only allows temporary access (e.g., a quarantine/screening level of access) until further access rights are granted.

Figure 5:
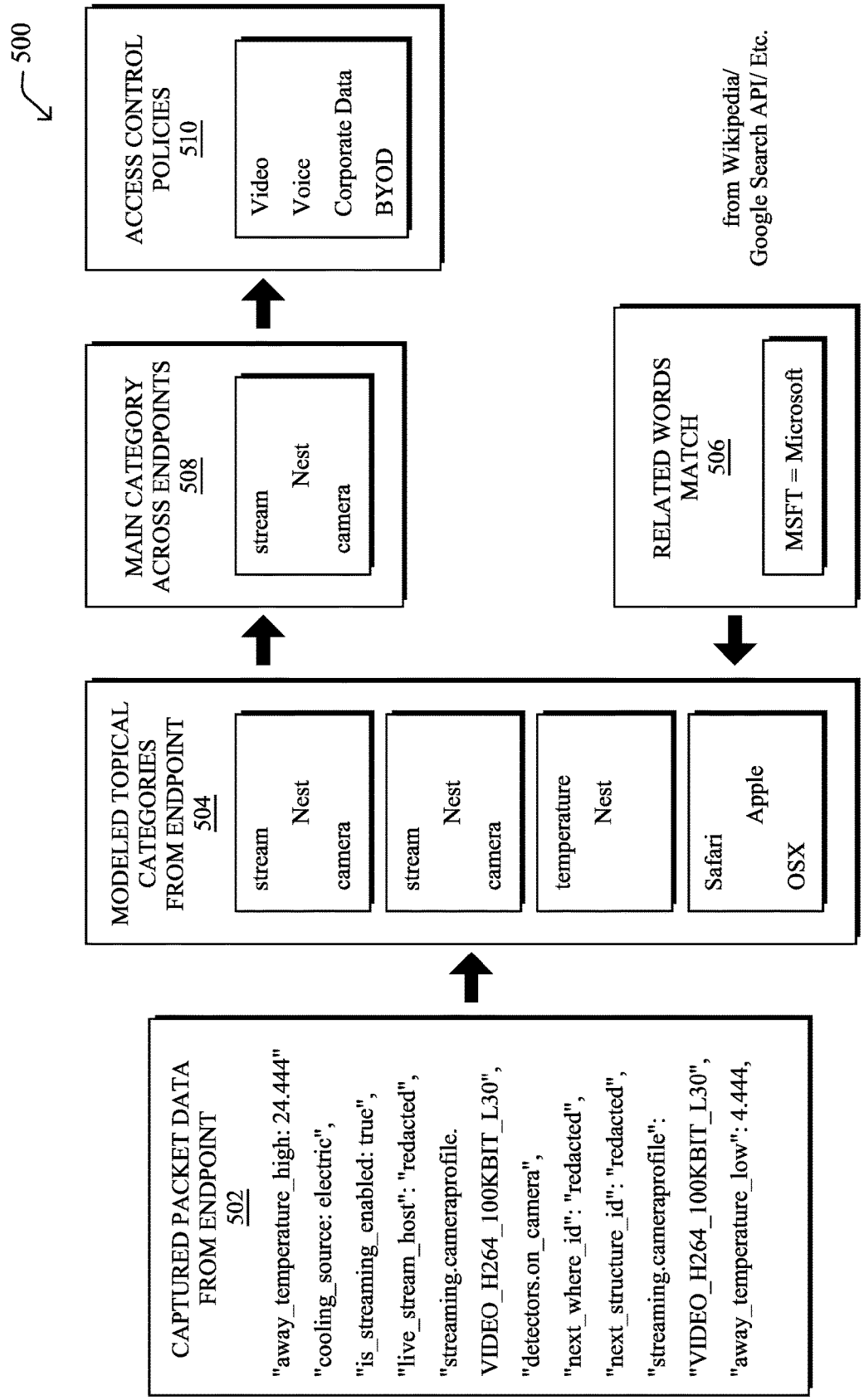
FIG. 5 illustrates an example of applying a topical model to determine a device type.

FIG. 5 illustrates an example 500 of applying a topical model to determine a device type, according to various embodiments. As shown, assume that captured packet data 502 from a particular endpoint node includes a number of words that can be extracted. For example, the traffic associated with the endpoint node may include words such as 'away_temperature_high: 24.444,' 'cooling_source: electric,' etc. From these words, the system may perform a related words match 506 to identify any semantically related words to those from captured packet data 502.

Based on the extracted words from captured packet data 502 and the semantically related words match 506, the system may identify the modeled topical categories 504 for the endpoint node. For example, based on captured packet data 502 including words such as 'streaming.cameraprofile.VIDEO_H264_100KBIT_L30,' 'detectors.on_camera,' etc., the system may determine that the endpoint node is associated with a topical category related to the words 'stream,' 'Nest,' and 'camera.'

Once the one or more topical categories associated with a particular endpoint node have been identified, the system may identify the main category 508 of the endpoint node across the topical categories of the various endpoint nodes. For example, as shown, based on the modeled topical categories 504 of the particular endpoint node, the system may determine that the endpoint node is most associated with the topical category related to the words 'stream,' 'Nest,' and 'camera.' In other words, the system may determine the similarity between the identified topical categories 504 for the endpoint and those of other endpoints, to determine the main category for the endpoint node.

In turn, based on the topical categorization for the endpoint node, the system may apply one or more security/access control policies 510 to the endpoint node. For example, if the topical category for the endpoint node is closest to that of a security camera, the system may apply a corresponding policy 510 to the endpoint node.

Figure 6:
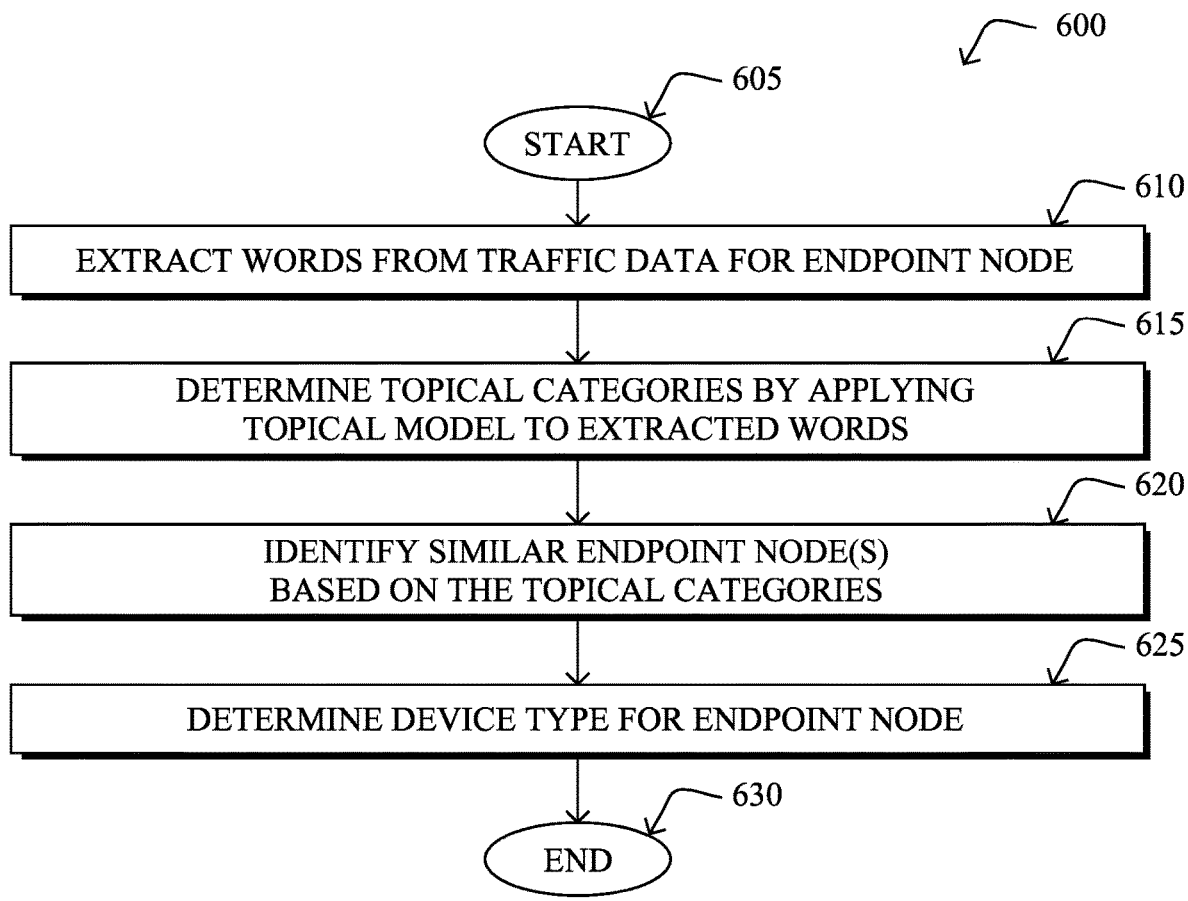
FIG. 6 illustrates an example simplified procedure for determining a device type using a machine learning-based topical model.

FIG. 6 illustrates an example simplified procedure for determining a device type using a machine learning-based topical model, in a network in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may extract words from traffic data for a particular endpoint node in the network. The traffic data may include, for example, data regarding the headers and/or payloads of the packets of the traffic flows sent by, or destined to, the endpoint node. In some cases, the traffic flows may even be encrypted flows, such as TLS flows.

At step 615, as detailed above, the device may determine one or more topical categories associated with the particular endpoint by applying a machine learning-based topical model to the extracted words from step 610. In some embodiments, the device may use an unsupervised learning approach, such as by applying a histogram to the words using a naïve Bayesian approach. In doing so, words that are semantically related may be grouped according to their topical categories.

At step 620, the device may identify one or more similar endpoint nodes based on the topical categories, as described in greater detail above. Notably, the device may determine how similar the topical categories of the endpoint node under analysis are to those of other endpoint nodes. In some embodiments, the device may compute a similarity score between the categories. For example, the device may compute Fisher kernels, to determine how similar the categories of the node are to those of other nodes.

At step 625, as detailed above, the device may determine a device type for the endpoint node based on a device type associated with the similar endpoint(s). For example, if the categories associated with the particular endpoint node are deemed similar to those of security cameras in the network, the device may determine that the particular endpoint node is also a security camera. Based on the device type, the device may cause the performance of an action in the network. For example, the device may generate a notification regarding the determined device type or cause the application of a security policy to the particular endpoint node (e.g., to prevent the node from accessing certain content or resources in the network, etc.). Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for device profiling without the use of static profiling rules. Instead, the techniques herein are able to dynamically discover the device type of an endpoint node. This allows the system to adapt to new versions of devices and better react to the ever increasing number and types of devices in the IoT. Notably, as the IoT expands, the number of static profiling rules that would otherwise be required will also grow, to support the new devices.

While there have been shown and described illustrative embodiments that provide for profiling an endpoint node using a topical model, it is to be understood that various other adaptations and modifications may be made within the spirit and scope of the embodiments herein. For example, while certain embodiments are described herein with respect to using certain models, the models are not limited as such and may be used for other functions, in other embodiments. In addition, while certain protocols are shown, other suitable protocols may be used and assessed, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   extracting, by a device in a network, words from traffic data for a particular endpoint node in the network;
   determining, by the device, one or more topical categories associated with the particular endpoint node by applying a machine learning-based topical model to the extracted words;
   identifying, by the device, one or more similar endpoint nodes in the network based on a similarity between the determined one or more topical categories associated with the particular endpoint node and one or more topical categories associated with the one or more similar endpoint nodes;
   identifying, by the device, a device type of the one or more similar endpoint nodes;
   determining, by the device, a device type for the particular endpoint node that corresponds to the device type of the one or more similar endpoint nodes; and
   controlling, by the device, access to content or resources in the network for the particular endpoint node based on the determined device type for the particular endpoint node.

2. The method as in claim 1, wherein extracting the words from the traffic data for the particular endpoint node comprises:
   causing, by the device, one or more networking devices in the network to extract the words; and
   receiving, at the device, the extracted words from the one or more networking devices.

3. The method as in claim 1, further comprising:
   capturing, by the device, the traffic data for the particular endpoint node.

4. The method as in claim 1, wherein determining the one or more topical categories associated with the particular endpoint node by applying a machine learning-based topical model to the extracted words comprises:
   applying, by the device, a histogram to the extracted words using a nave Bayesian approach, to determine the one or more topical categories.

5. The method as in claim 4, wherein determining the one or more topical categories associated with the particular endpoint node further comprises:
   clustering, by the device, the extracted words using semantic information from a dictionary.

6. The method as in claim 1, wherein identifying the one or more similar endpoint nodes comprises:
   computing, by the device, a similarity score between the one or more topical categories associated with the particular endpoint node and the one or more topical categories associated with the one or more similar endpoint nodes.

7. The method as in claim 6, wherein the similarity score is based on a Fisher kernel.

8. The method as in claim 1, wherein the traffic data for the particular endpoint node comprises data regarding an encrypted traffic flow associated with the particular endpoint node.

9. An apparatus, comprising:
   one or more network interfaces to communicate with a network;
   a processor coupled to the one or more network interfaces and configured to execute a process; and
   a memory configured to store the process executable by the processor, the process when executed operable to:
   extract words from traffic data for a particular endpoint node in the network;
   determine one or more topical categories associated with the particular endpoint node by applying a machine learning-based topical model to the extracted words;
   identify one or more similar endpoint nodes in the network based on a similarity between the determined one or more topical categories associated with the particular endpoint node and one or more topical categories associated with the one or more similar endpoint nodes;
   identify a device type of the one or more similar endpoint nodes;
   determine a device type for the particular endpoint node that corresponds to the device type of the one or more similar endpoint nodes; and
   control access to content or resources in the network for the particular endpoint node based on the determined device type for the particular endpoint node.

10. The apparatus as in claim 9, wherein the apparatus extracts the words from the traffic data for the particular endpoint node by:
    causing one or more networking devices in the network to extract the words; and
    receiving the extracted words from the one or more networking devices.

11. The apparatus as in claim 9, wherein the process when executed is further operable to:
    capture the traffic data for the particular endpoint node.

12. The apparatus as in claim 9, wherein the apparatus determines the one or more topical categories associated with the particular endpoint node by:
    applying a histogram to the extracted words using a nave Bayesian approach, to determine the one or more topical categories.

13. The apparatus as in claim 12, wherein the apparatus further determines the one or more topical categories associated with the particular endpoint node by:
    clustering the extracted words using semantic information from a dictionary.

14. The apparatus as in claim 9, wherein the apparatus identifies the one or more similar endpoint nodes by:
  computing a similarity score between the one or more topical categories associated with the particular endpoint node and the one or more topical categories associated with the one or more similar endpoint nodes.

15. The apparatus as in claim 14, wherein the similarity score is based on a Fisher kernel.

16. The apparatus as in claim 9, wherein the traffic data for the particular endpoint node comprises data regarding an encrypted traffic flow associated with the particular endpoint node.

17. A tangible, non-transitory, computer-readable medium storing program instructions that, when executed by a device in a network, cause the device to perform a process comprising:
  extracting, by the device, words from traffic data for a particular endpoint node in the network;
  determining, by the device, one or more topical categories associated with the particular endpoint node by applying a machine learning-based topical model to the extracted words;
  identifying, by the device, one or more similar endpoint nodes in the network based on a similarity between the determined one or more topical categories associated with the particular endpoint node and one or more topical categories associated with the one or more similar endpoint nodes;
  identifying, by the device, a device type of the one or more similar endpoint nodes;
  determining, by the device, a device type for the particular endpoint node that corresponds to the device type of the one or more similar endpoint nodes; and
  controlling, by the device, access to content or resources in the network for the particular endpoint node based on the determined device type for the particular endpoint node.

18. The computer-readable medium as in claim 17, wherein the device determines the one or more topical categories associated with the particular endpoint node by:
  applying, by the device, a histogram to the extracted words using a naïve Bayesian approach, to determine the one or more topical categories.

\* \* \* \* \*

UNITED STATES PATENT AND TRADEMARK OFFICE
CERTIFICATE OF CORRECTION

PATENT NO. : 11,200,488 B2  
APPLICATION NO. : 15/444753  
DATED : December 14, 2021  
INVENTOR(S) : Pok Wong Page 1 of 1

It is certified that error appears in the above-identified patent and that said Letters Patent is hereby corrected as shown below:

In the Claims

In the Claim 4, Column 13, Line 66, please amend as shown:
words using a naive Bayesian approach, to determine In the Claim 13, Column 14, Line 60, please amend as shown:
applying a histogram to the extracted words using a naive Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*